(12) United States Patent
Gu

(10) Patent No.: US 7,567,009 B2
(45) Date of Patent: Jul. 28, 2009

(54) STATOR ARRANGEMENT FOR AN ELECTRIC MACHINE AND A METHOD FOR MANUFACTURING THE STATOR ARRANGEMENT

(75) Inventor: Chunhui Gu, Kanzleigasse (DE)

(73) Assignee: Minebea Co., Ltd., Nagano-ken (JP)

( * ) Notice: Subject to any disclaimer, the term of this patent is extended or adjusted under 35 U.S.C. 154(b) by 331 days.

(21) Appl. No.: 11/504,633

(22) Filed: Aug. 16, 2006

(65) Prior Publication Data
US 2007/0040467 A1  Feb. 22, 2007

(30) Foreign Application Priority Data
Aug. 17, 2005 (DE) ............... 10 2005 038 942
Aug. 11, 2006 (DE) ............... 10 2006 037 758

(51) Int. Cl.
*H02K 1/00* (2006.01)
(52) U.S. Cl. ............... 310/216; 310/217; 310/260
(58) Field of Classification Search ............... 310/71, 310/67 R, 216–218, 254, 260, 259
See application file for complete search history.

(56) References Cited

U.S. PATENT DOCUMENTS

| | | | |
|---|---|---|---|
| 5,194,775 A * | 3/1993 | Cooper | 310/260 |
| 5,604,389 A * | 2/1997 | Nitta et al. | 310/67 R |
| 6,847,285 B2 * | 1/2005 | Sirois et al. | 336/234 |
| 2006/0197401 A1 * | 9/2006 | Takamatsu et al. | 310/216 |
| 2006/0197402 A1 * | 9/2006 | Gomyo et al. | 310/216 |
| 2006/0238063 A1 * | 10/2006 | Neal | 310/259 |

FOREIGN PATENT DOCUMENTS

| | | |
|---|---|---|
| EP | 0560007 A1 | 9/1993 |
| EP | 1249920 A2 | 3/2009 |
| GB | 1239919 | 4/1971 |
| JP | 2001119871 A | 4/2001 |
| JP | 2004159476 A | 6/2004 |
| JP | 2006014548 A * | 1/2006 |

* cited by examiner

*Primary Examiner*—THanh Lam
(74) *Attorney, Agent, or Firm*—Duane Morris LLP

(57) ABSTRACT

A stator arrangement for an electric machine having a stator body which has a back yoke ring and a number of stator teeth that project in a radial direction from the back yoke ring, wherein at least one additional ferromagnetic stator end lamination is mounted on at least one end face of the back yoke ring, the additional ferromagnetic stator end lamination being substantially flush with the back yoke ring, wherein projections are formed at the inner or outer circumference of the additional stator end lamination, the projections projecting axially from the outer end face of the stator end lamination and forming a guide for the winding wire.

9 Claims, 6 Drawing Sheets

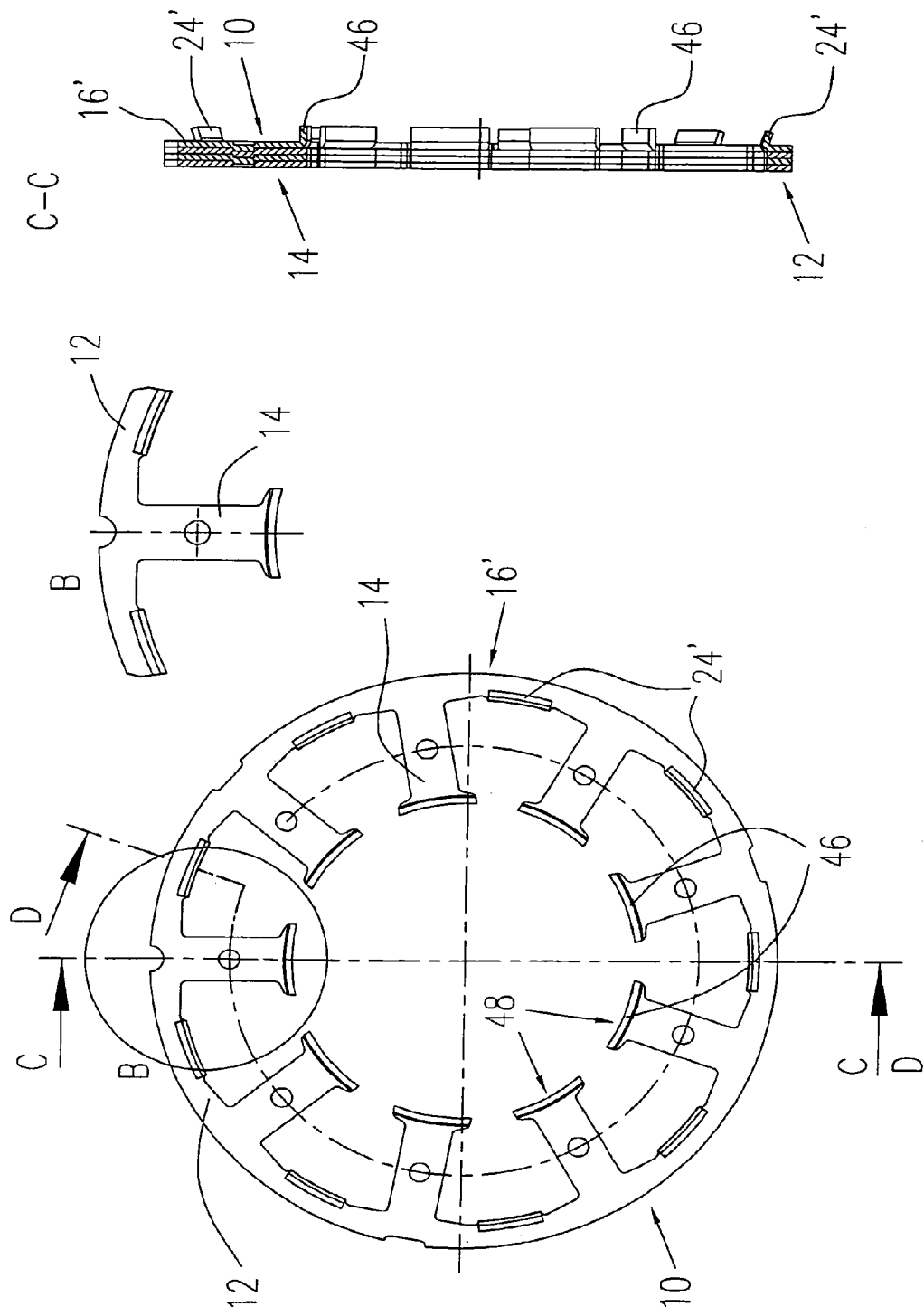

Figure 1:
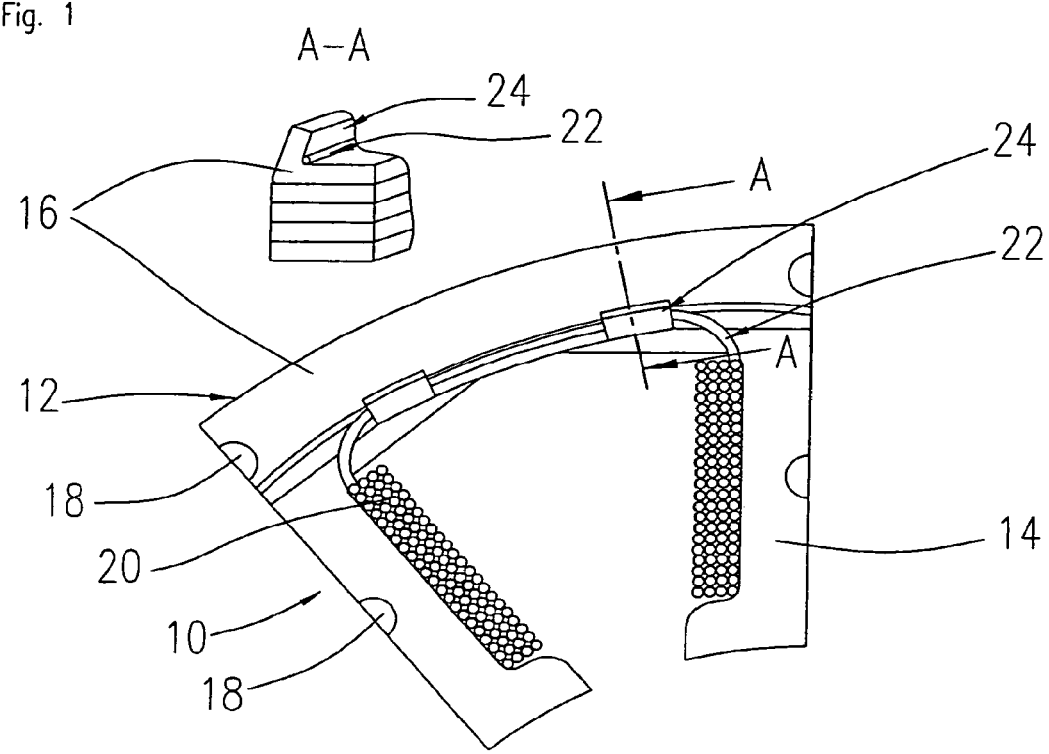

STATOR ARRANGEMENT FOR AN ELECTRIC MACHINE AND A METHOD FOR MANUFACTURING THE STATOR ARRANGEMENT

FIELD OF THE INVENTION

The invention relates to a stator arrangement for an electric machine as well as a method for its manufacture. The stator arrangement comprises a stator body that has a back yoke ring and a number of stator teeth which project from the back yoke ring in a radial direction.

BACKGROUND OF THE INVENTION

A preferred field of application for the invention is in brushless DC motors and other permanent magnet motors that can be configured as inner rotor motors or as outer rotor motors. However, the invention can also be applied to other types of electric machines. Electric machines having an inner rotor configuration comprise a rotor arrangement that is mounted onto a shaft and carries one or more permanent magnets, as well as a stator arrangement usually constructed from a number of stacked metal laminations which form a closed stator back yoke from which stator teeth project radially inwards. The stator teeth carry the phase windings. Building up the stator from a stack or packet of laminations has the aim of reducing the eddy current loss in the stator body. The pole shoe serves to absorb the magnetic flux of the stator teeth, stator slots being located between the stator teeth to receive the windings. The rotor arrangement is inserted coaxially into the stator arrangement. In the case of an outer rotor motor, the stator is designed with a back yoke ring and stator teeth projecting radially outwards, the rotor arrangement coaxially enclosing the stator. The stator, consisting of a lamination stack and windings, is often referred to as an armature for both inner rotor motors as well as outer rotor motors.

It is known in the prior art to build up a stator body from a plurality of slotted metal laminations that are die-cut in a shape which corresponds to the cross-section of the stator body and are assembled to form a laminated sheet metal stack. These kinds of laminated stacks make it possible to reduce eddy current loss.

A preferred field of application for the stator arrangement according to the invention is in spindle motors for hard disk drives that contain magnetic or optic storage disks. Such hard disk drives are used in computers, mobile telephones, MP3 players, digital cameras, DVD players and other electronic equipment used to save digital information. These drives are becoming increasingly miniaturized with storage disks having form factors of 2.5 inches, 1.8 inches, 1 inch and 0.85 inches being already included in the prior art, making it thus necessary for the motors to be correspondingly small.

For this field of application, the overall height of the motor, including the winding heads, must consequently be kept as low as possible. Overall motor heights in the magnitude of less than 4 mm are commonplace nowadays.

A stator arrangement for an electric motor is known from JP 2001119871 in which the metal laminations forming the stator arrangement are miniaturized in order to produce a compact spindle motor. In addition to stator teeth, one of the laminations from which the stator is constructed has tongues that are longer than the overall thickness of the lamination stack, the tongues being formed between adjacent stator teeth and bent at a right angle so that they extend along the inside of the back yoke ring and project upwards from the side of the back yoke ring. The projecting part of these tongues at the tip forms a holding element to guide the winding wire between adjacent stator teeth.

One of the problems arising for miniaturized spindle motors is that due to the low permissible overall height of the motor, both the winding space and the space available for the winding terminal is restricted. In the Japanese publication discussed above, the problem also occurs that the tongues extend through the stator slots and, therefore, occupy part of the winding space; due to the small overall volume of the motor, this can result in a noticeable reduction of motor power.

It is an object of the present invention to provide a stator arrangement for an electric machine which is suitable for use in miniaturized hard disk drives. At the same time, the problems concerning the restricted space for the windings and for guiding the winding wires between adjacent stator teeth are to be solved.

SUMMARY OF THE INVENTION

The invention provides a stator arrangement for an electric machine in a stator body which has a back yoke ring and a number of stator teeth that project in a radial direction from the back yoke ring. According to the invention, at least one additional ferromagnetic lamination ring is mounted on one or both end faces of the back yoke ring of the stator, the additional ferromagnetic lamination ring being substantially flush with the back yoke ring and carrying a part of the magnetic flux through the stator when the machine is in operation, thus reducing the magnetic saturation of the stator. The additional lamination rings are also referred to hereafter as "stator end laminations". In a first embodiment of the invention, the stator end lamination is shaped so that it does not or not fully cover the stator teeth. The stator end lamination is in magnetic contact with the back yoke ring and acts as an additional bypass that the magnetic flux can take (stator yoke relief). This is particularly advantageous for very small spindle motors in which the overall axial length of the stator including the winding heads does not exceed 2 mm, for example, since with such low heights the stator can easily become saturated. The invention makes it possible to realize spindle motors whose stator arrangement has an overall height of 2-3 mm or smaller, where the stator lamination stacks consist merely of a very few thin laminations. Thus stators are stacked, for example, with only 3 to 5 laminations, each of which are a mere 0.15 mm to 0.35 mm thick. The invention helps to relieve the stator back yoke of magnetic saturation.

The stator teeth of the stator body are wound with winding wire that forms a winding head on the axial end faces of the stator body. This winding head increases the axial length of the stator only in the region of the stator teeth, the at least one additional ferromagnetic lamination ring that is flush with the back yoke ring of the stator coming to lie beside the winding head and consequently not contributing to an increase in the overall axial length of the stator. In addition, the uppermost additional ferromagnetic lamination ring acts as a guide for the winding wire that runs between the stator teeth and can come to lie against this additional ferromagnetic lamination ring.

In a second embodiment of the invention, the stator end lamination has essentially the same shape as the remaining stator laminations wherein, in the first and second embodiments, projections are formed at the inner or outer circumference of the stator end lamination. These projections project axially from the outer face of the stator end lamination and form a winding wire guide. The projections are designed and arranged such that the winding wire running between two stator teeth can be laid around the projections and be held in position by the projection. As compared to the Japanese patent application discussed above, the embodiment according to the invention has the advantage that the projections forming the winding wire guide are formed at the stator end lamination which is located at the end face of the stator body at which the projections are needed. This results in a simpler structure, and it is not necessary to provide respective tongues which extend along the axial length of the stator body at the inner or outer circumference thereof.

For forming these winding wire guide projections, the stator end lamination is provided with simple tongues which, during manufacture of the stator arrangement, initially project radially inwards (for an inner rotor motor) or outwards (for an outer rotor motor) and are bent like hooks in the direction of an outer end face of the stator end lamination. The projections can be formed before or after the stator end lamination has been joined with the remaining stator body.

In the preferred embodiment of the invention, the stator is made up of a lamination stack by punching out and packing the laminations, the stator end laminations also being punched out and assembled together with the stator laminations, which form the stator back yoke and the stator teeth, to make up a lamination stack. Here, it should be noted that in one embodiment of the invention the stator end laminations are flush with only the yoke and do not contribute in any way to the stator teeth. Besides guiding the wire, the advantage of the invention is in the fact that, owing to the additional stator end laminations, the magnetic saturation of the stator back yoke can be reduced or avoided without increasing the axial overall height of the stator, provided that the stator end laminations do not have a larger axial thickness than the winding head.

When the stator end lamination has essentially the same shape as the remaining stator laminations, in a further embodiment of the invention, projections are formed at the stator end lamination in the area of the pole shoes at the distal ends of the stator teeth, the projections extending in axial direction from the outer face of the stator end lamination. For forming these projections, the stator end lamination is extended at the pole shoes and is bent according to an L-shape so that there is an extension of the pole shoes in the axial direction. The projections can be formed before or after the stator end lamination is joined with the remaining stator body. By providing the L-shaped extension of the pole shoes, the pole shoes have a larger surface area and can receive larger magnetic flux.

SHORT DESCRIPTION OF DRAWINGS

Figure 2:
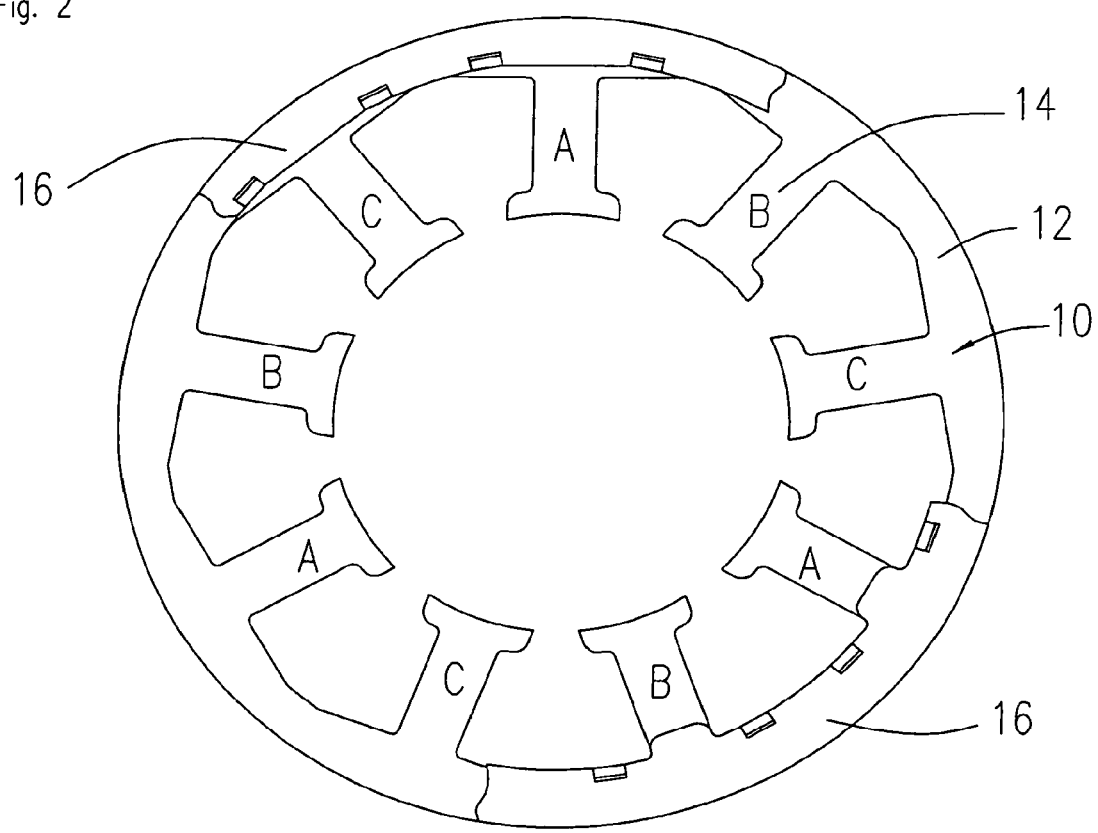
Figure 3:
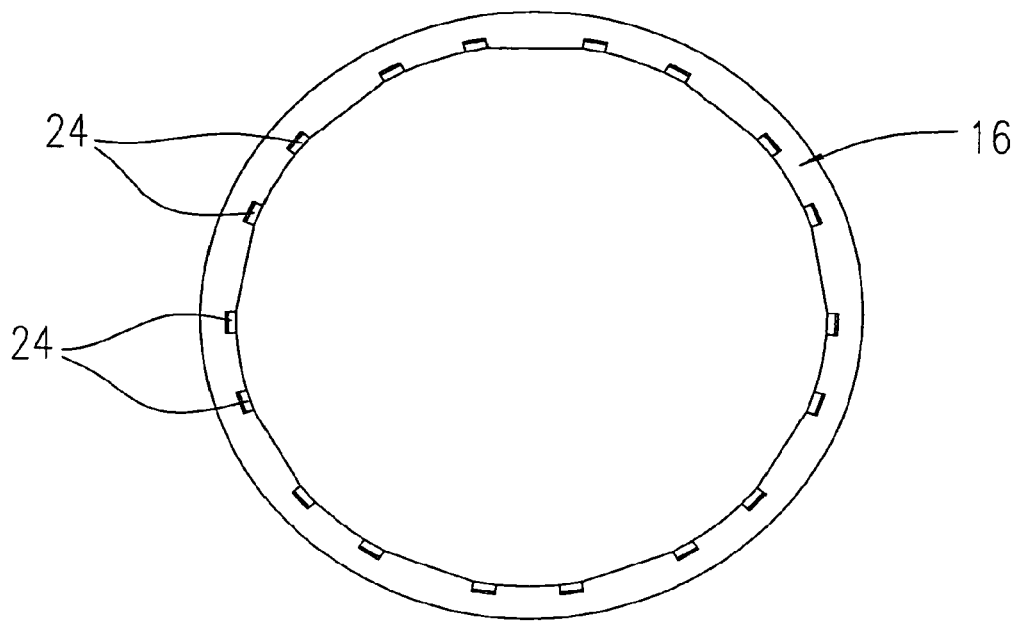
Figure 4:
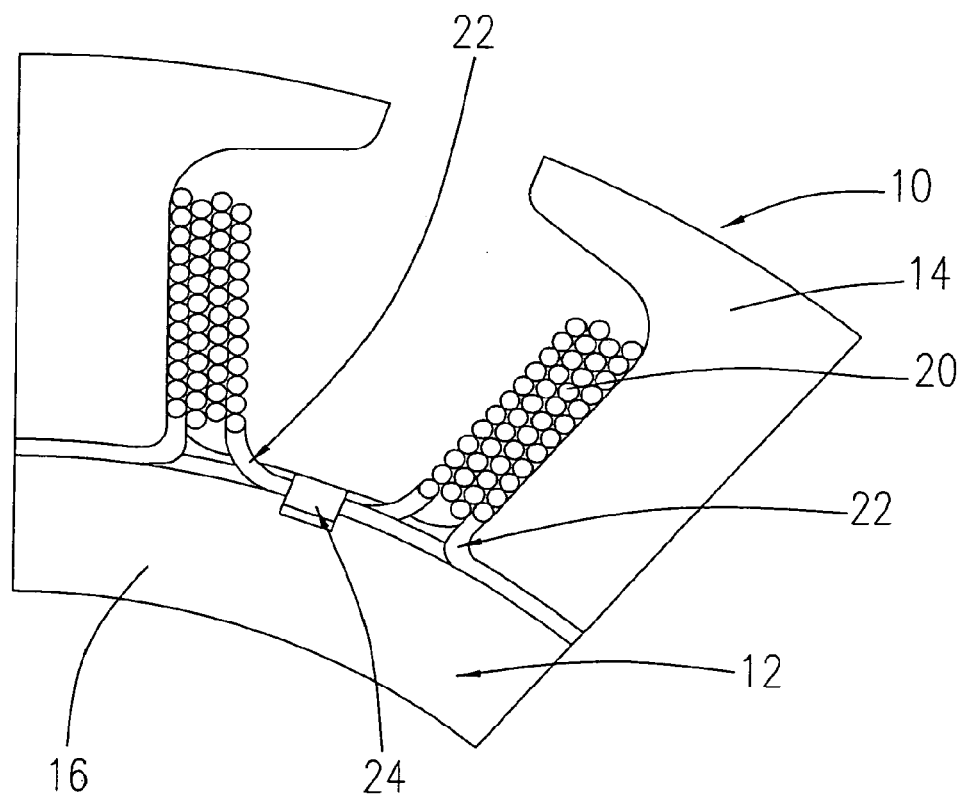
Figure 5:
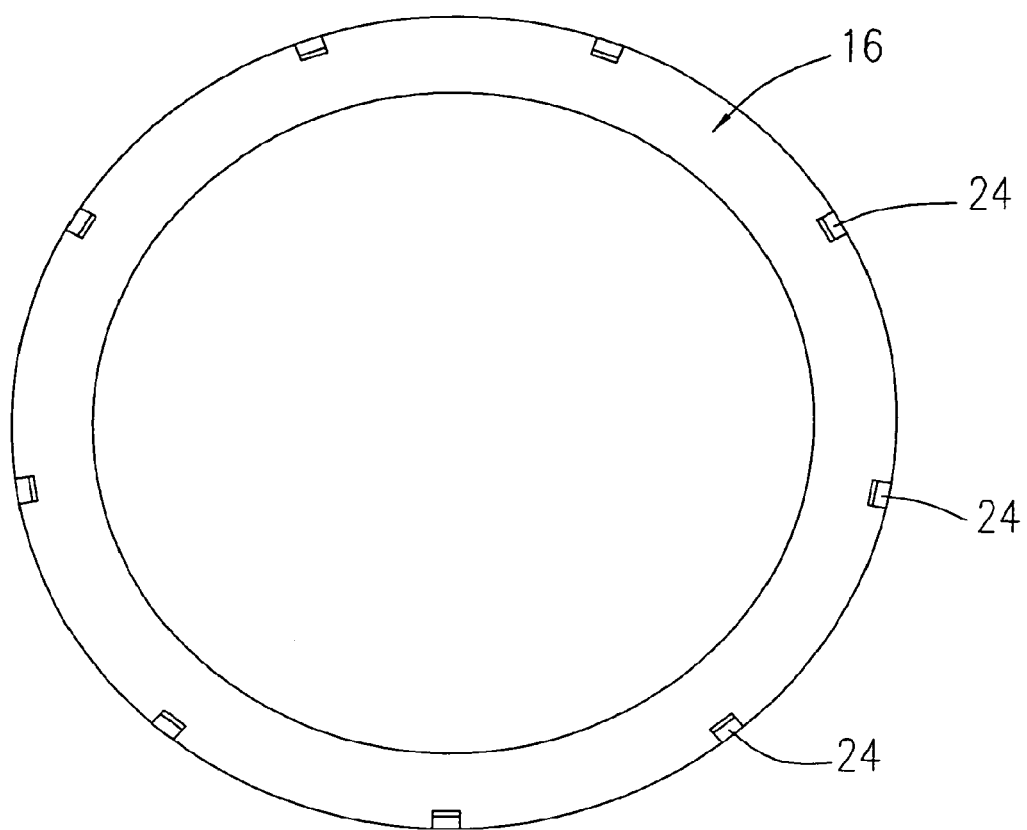
Figure 6:
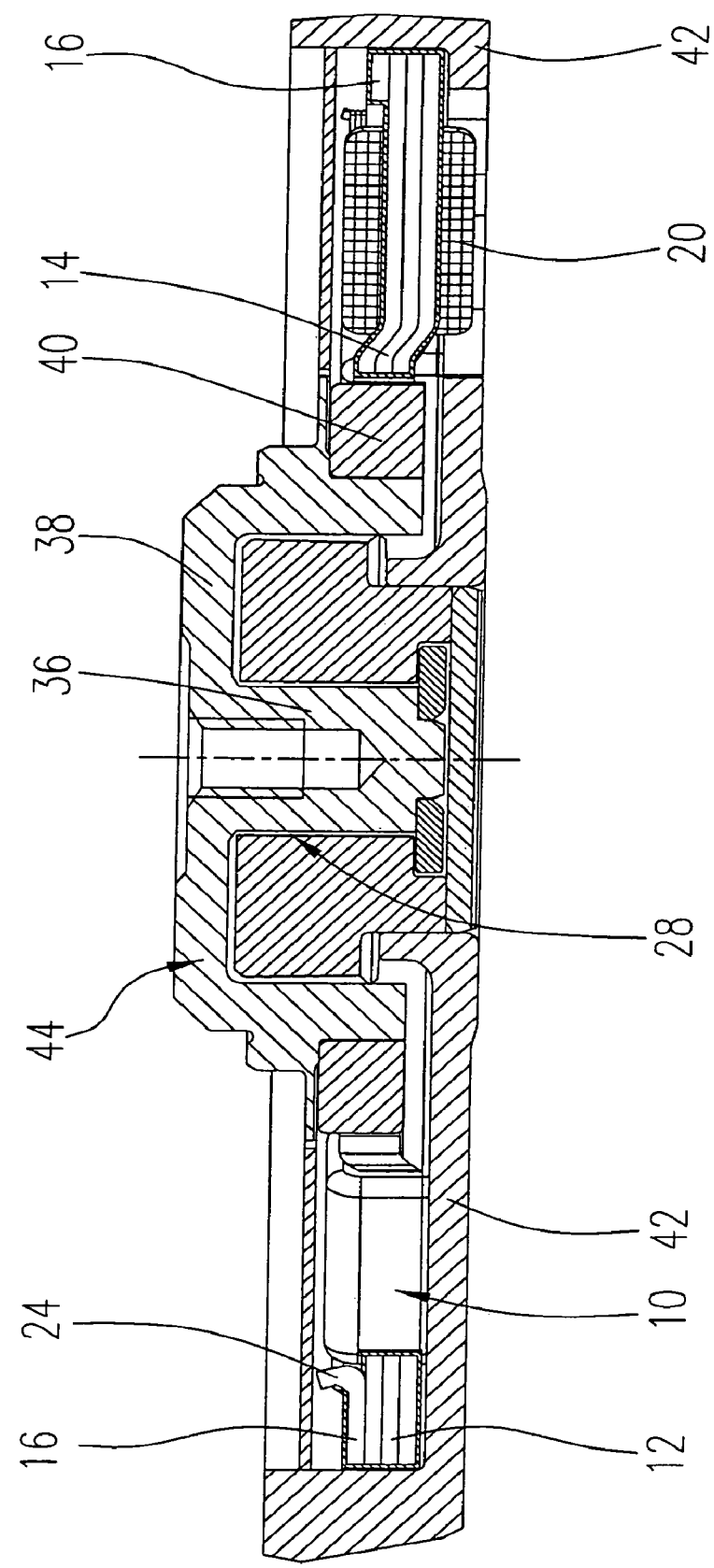
Figure 9:
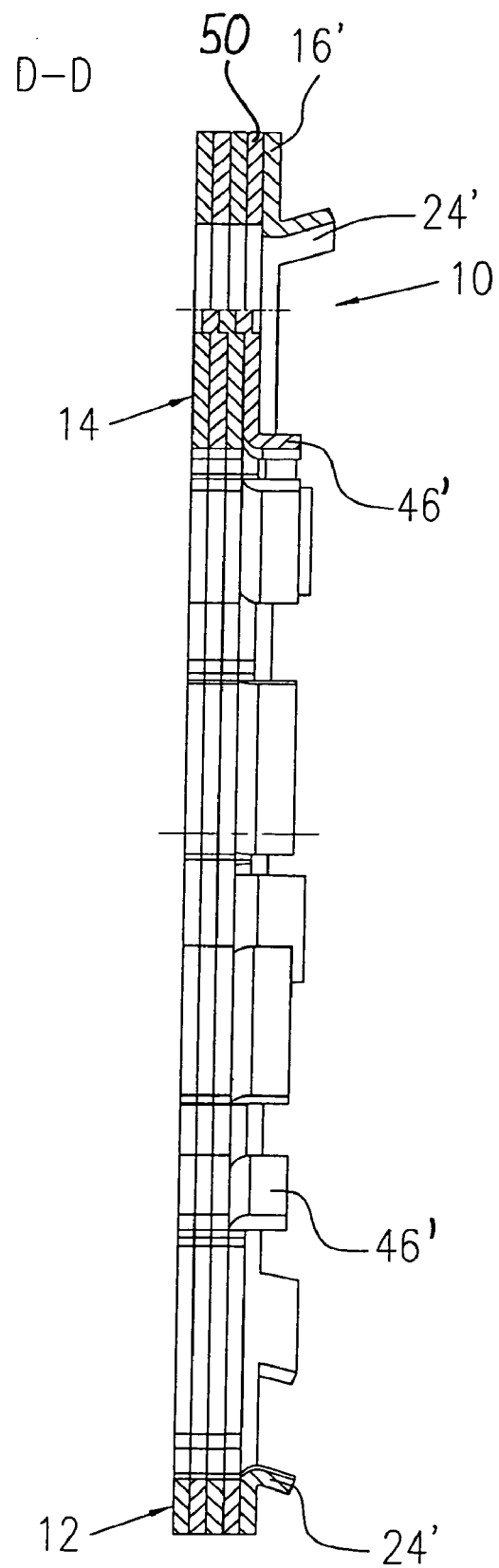

The invention is described in more detail below on the basis of preferred embodiments with reference to the drawings. The figures show:

FIG. 1 a schematic partial view of a stator arrangement for an inner rotor motor according to one embodiment of the invention;

FIG. 2 a view from above of a lamination for the stator arrangement of FIG. 1 having two different stator end laminations shown in part;

FIG. 3 a view from above of a stator end lamination for the stator arrangement of FIG. 1;

FIG. 4 a schematic partial view of a stator arrangement for an outer rotor motor according to the invention;

FIG. 5 a view from above of a stator end lamination for the stator arrangement of FIG. 4;

FIG. 6 a schematic sectional view through an electric motor in which the stator arrangement according to FIGS. 1 to 5 is employed;

FIG. 7 a view from above of a lamination for the stator arrangement according to a further embodiment of the invention;

FIG. 8 a sectional view through the stator arrangement of FIG. 7, taken along the line C-C; and FIG. 9 a sectional view through the stator arrangement of FIG. 7, taken along the line D-D.

DESCRIPTION OF PREFERRED EMBODIMENTS

FIG. 1 schematically shows a partial view of a stator arrangement for an inner rotor motor according to one embodiment of the invention as seen from above. The stator arrangement comprises a stator body 10 that has a back yoke ring 12 and stator teeth 14 projecting radially inwards from the back yoke ring 12. In the section of FIG. 1 indicated by A-A, a sectional view through the stator body 10 along the line A-A is shown in perspective. It can be seen from this that the stator body 10 is made up of a stack of stamped and packed metal laminations. At least the uppermost of these laminations is designed as an additional ferromagnetic lamination ring 16, the so-called stator end lamination, that is preferably made of the same material as the other laminations in the stack but does not have any stator teeth 14. The laminations making up the stator body 10 are preferably punched out of thin dynamo sheet metal and connected together using a well-known stamping/stacking process. The connecting points are schematically indicated at 18. Windings 20 are applied to the stator teeth 14, the windings 20 of those stator teeth 14 belonging to the same phase being connected via a connecting wire 22.

In the stator arrangement shown in FIG. 1, the stator body 10 has an additional stator end lamination 16 which is substantially flush with the back yoke ring 12. The additional stator end lamination 16, does not contribute to the stator teeth and consequently only goes to increase the axial length of the stator body 10 in the region of the back yoke ring 12. Like the rest of the stator body, the stator end lamination is also preferably made from dynamo sheet metal. The stator end lamination has a plurality of tongue-like projections 24, which, in the illustrated embodiment for an inner rotor motor, project from the inside circumference of the stator end lamination 16 and are bent in the way of hooks such that they preferably form an angle of ≦90 degrees, e.g. an angle between 70° and 80°, in particular an angle of about 75°, with the surface of the stator end lamination 16. If several stator end laminations are provided on one side of the stator lamination stack, preferably only the most outward lying stator end lamination has the projections 24. The projections 24 guide and position the connecting wires 22 that connect the stator teeth 14 belonging to the same phase so that the connecting wires are lead on the surface of the stator end lamination 16 close to the inside circumference of the end lamination. The projections 24 can be bent, for example, in a single operation with the die-cutting of the stator end lamination 16.

The stator end lamination 16, or the plurality of stator end laminations, and the projections 24 are preferably so dimensioned that, when the stator body 10 is wound, they do not project in an axial direction beyond the winding head formed by the windings 20. Particularly in stator arrangements having a low stack height, i.e. a low axial length of the stator body 10, and a back yoke ring 12 whose diameter is kept as small as possible in order to reduce the overall dimensions of the motor, the stator arrangement according to the invention has the advantage that the space directly adjoining the winding head is used for the purpose of increasing the cross-section of the stator back yoke as well as guiding the winding wire between adjacent coils of the same phase.

As illustrated in FIG. 1, the projections 24 to guide and position the winding wire are preferably disposed between the stator teeth 14, it being possible to provide one or more projections between each two stator teeth. Moreover, in the illustrated inner rotor configuration, the projections 24 are preferably disposed at the inside circumference of the stator end lamination 16. In another embodiment of the invention, the stator arrangement can have an additional stator end lamination without projections on one side of the back yoke ring 12 and a stator end lamination 16 having projections on the other side of the back yoke ring 12 in order to maximize the cross-section of the stator back yoke, it generally only being necessary to guide the winding wire between two stator teeth of the same phase on one side of the back yoke ring 12. However, it also lies within the scope of the invention to provide stator end laminations 16 having projections on each of the end faces of the back yoke ring 12.

In contrast to the illustrated embodiment, it is further possible for the at least one stator end lamination 16 to have a different thickness to the other stator laminations used to make up the stator body. Moreover, it lies within the scope of the invention to use a plurality of stator end laminations 16 in order to maximize the cross-section of the stator back yoke. If a plurality of stator end laminations 16 are used, the described projections 24 are preferably only formed on the outermost stator end lamination 16.

What is more, the stator end laminations 16 substantially cover the back yoke ring 12 of the stator body 10. However, it is also possible for the stator end laminations to partially cover the stator tooth bridges 14 as indicated in partial view in FIG. 2.

FIGS. 2 and 3 show a simplified view from above of a lamination section to form a stator body 10 having a back yoke ring 12 and stator teeth 14 and a view from above of the stator end lamination 16 that has the described projections 24.

A stator lamination for a 9-slot, 3-phase DC motor is shown by way of example in FIG. 2. The windings wound on the stator teeth that carry the same letters A, B or C are connected electrically. To this effect, it is preferable if the winding wire is led around the wire guide tongues 24 in order to connect all the phase coils to each other.

FIG. 4 shows a schematic partial view of a stator arrangement for an outer rotor motor according to another embodiment of the invention. Components corresponding to those in FIGS. 1 to 3 are indicated by the same reference numbers. As can be seen from FIGS. 4 and 5, the basic principles of the invention can be equally applied to electric machines having inner rotor and outer rotor configurations. In the stator arrangement for an outer rotor motor as shown in FIGS. 4 and 5, the stator teeth 14 extend radially outwards from the back yoke ring 12. The projections 24 are correspondingly disposed on the outside circumference of the stator end lamination 16 in order to guide and position the connecting wire 22 between two adjacent coils.

Unlike the embodiment of FIGS. 1 to 3, in FIGS. 4 and 5, individual projections 24 are shown between two adjacent stator teeth 14. The number of projections between two adjacent stator teeth is not critical. The projections 24 also need not be disposed centrally between two adjacent stator teeth 14, they could even overlap the stator teeth 14 provided that they are suitably designed and disposed so as to guide and position the winding wire between two adjacent stator teeth.

FIG. 6 shows by way of example the use of the stator arrangement according to the invention in an inner rotor electric motor for driving microdrives. The cross-section of a stator body 10, three main stator laminations 14 and an additional stator end lamination 16 on its back yoke ring 12 can be identified. It can be seen that the tongue 24 for guiding the winding wire does not project or projects only negligibly in an axial direction beyond the winding heads of the windings 20.

The motor is enclosed by a housing 42. The rotatable shaft 36 is connected to a hub 38 and, together with the annular rotor magnets 40 disposed on the outside circumference of the hub, forms the rotor arrangement.

Also illustrated and used to support the electric motor is a fluid dynamic bearing whose design and function will not be dealt with here. This is not to be understood as a limiting factor; the electric motor could equally be supported by a ball bearing or any other type of bearing.

The motor shown in FIG. 6 is a miniaturized spindle motor in which the assembly, consisting of stator and rotor including the winding heads of the windings 20, has an overall height in the order of magnitude of a mere 2 mm. For these kinds of motors, only three to four stator laminations 14 having a thickness of 0.6 to 0.8 mm are used to form the stator body. It can be clearly seen that the thickness of the stator end lamination 16 does not have any effect on the overall height of the motor.

It will be understood that for stator arrangements having this type of construction, the problem of magnetic saturation of the stator back yoke 12 is particularly critical. By adding one or more stator end laminations 16, the invention solves two problems at the same time. The cross-section of the back yoke ring 12 is increased so that the back yoke ring cannot become saturated as easily, and through the projections 24, the stator end lamination 16 creates a guide for the winding wire between the coils of the individual phases. As explained, the stator end lamination 16 is flush with the back yoke ring 12. However, it lies within the scope of this embodiment for the stator end lamination 16 to also partially extend over the tooth bridge provided that the winding space for the windings 20 is not significantly restricted by this and the axial dimensions of the winding heads is not enlarged. The stator end lamination 16 can extend over a part of the tooth bridge that makes up about 1% to 20%, preferably 5% to 10%, of the length of the stator tooth bridge, as shown in FIG. 2. The space available in the motor is optimally exploited by the invention for the purpose of increasing the cross-section of the stator back yoke as well as providing a guide for the windings 20.

FIG. 7 shows a plan view of the stator arrangement for an inner rotor motor according to a further embodiment of the invention, wherein the coils are omitted for the sake of simplicity. Section B in FIG. 7 is also shown at enlarged scale. FIG. 8 shows a cross-section through the stator arrangement of FIG. 7 along the line C-C. Corresponding portions are designated with the same reference numbers as in the previous embodiments.

As described with regard to the previous embodiment of the invention, the stator arrangement comprises a stator body 10 that has a back yoke ring 12 and stator teeth 14 projecting radially inwards from the back yoke ring 12. From the drawing of FIG. 8, it can be recognized that the stator body 10 is made from a stack of stamped and packed metal laminations. The stator body comprises a stator end lamination 16' at one end face, the stator end lamination 16' being shown in FIG. 7. The stator end lamination preferably is made from the same material as the remaining laminations of the stack.

In the embodiment shown in FIGS. 7 and 8, the stator end lamination has essentially the same shape as the remaining laminations of the stack; however, additional tongues 24' and 46 for forming respective projections are formed at the stator end lamination 16'. The tongues 24' are formed at the inner circumference of the stator end lamination 16', basically as in the first embodiment, and are bent in the way of hooks so that they are inclined at an angle of preferably ≦90°, e.g. an angle between 70° and 80°, and in particular an angle of about 75°, against the surface of the stator end lamination 16'. With regard to the method of manufacturing, the design and function of the projections formed by the tongues 24', reference is made to the embodiment described above. Also, with regard to the materials used, material thicknesses, single and total dimensions of the stator arrangement and the electrical machine where the stator arrangement is used, reference is made to the above specifications which are also valid for the embodiment of FIGS. 7 and 8.

The embodiment of FIGS. 7 and 8 differs from the previously discussed embodiment in that the stator end lamination 16' is substantially fully aligned with the remaining stator laminations of the stator arrangement 10, i.e. the stator end lamination 16' also covers the stator teeth or stator poles 14. Accordingly, it extends across the back yoke ring 12 of the stator arrangement and the stator poles 14 up to the pole shoes 48. In the area of the pole shoes 48, the stator end lamination 16' is extended and bent to be essentially L-shaped, so that tongues or projections 46 are formed which project axially from the outer face of the stator end lamination 16' at the pole shoes of the stator teeth. Accordingly, the surface area of the pole shoes which are opposite to the rotor magnets (the rotor magnets are shown in FIG. 6) can be enlarged in order to receive more magnetic flux. Different from the embodiment shown, stator end laminations can be provided at both end faces of the stator packet.

Tongues 24', 46 for forming the projections can be formed using the same tool wherein the bending angles can be different. The tongues can be bent before or after the stator end lamination is fixed to the remaining lamination stack.

Also in the embodiment of FIGS. 7 and 8, the space available to the stator arrangement in a miniature motor, such as a microdrive, is used in an optimum way. The projections 24', 46 for forming the winding wire guide and increasing of the pole shoe surface area extend axially across about the same distances and do not or not essentially increase the axial dimension of the motor, under consideration of the axial dimension of the winding head formed by the windings. While the first embodiment increases the cross-section of the yoke, the latter embodiment increases the surface area of the pole shoes for receiving the magnetic flux from the rotor magnets. According to application and demands, one or the other embodiment of the invention can be chosen. Both embodiments are based on the idea to provide at least one stator end lamination in addition to the "normal" laminations of the stator stack, the additional stator end lamination providing additional functions, such as the winding wire guide and the increase of the pole shoe surface area, these functions being achieved by providing the projections.

The stator arrangement according to the invention makes it possible to guide and fix windings between adjacent phase coils. At the same time, the cross-section of the stator back yoke is enlarged by the invention and thus the magnetic saturation of the back yoke is reduced. In addition, the invention allows an increase of the pole shoe surface area for receiving the magnetic flux from the rotor magnets; wherein all of this can be achieved without decreasing the winding space.

According to a further aspect of the invention, shown in FIG. 9, the first and second embodiment, i.e. the enlargement of the pole shoe surface area and the enlargement of the stator yoke can be combined. To this end, e.g. a second to last stator lamination 50 is provided having stator teeth and projections 46', and a last stator end lamination 16 is provided having tongues 24' as in the first embodiment. The projections 46' of the second to last stator lamination 50 will be bent to be L-shaped for enlarging the pole shoe surface area. And the tongues 24' of the stator end lamination 16 form winding wire guides wherein the last stator end lamination 16 does not cover the stator poles. It should be noted that the embodiments of FIGS. 8 and 9 are identical when viewed from above so that both embodiments are represented commonly by the top view of FIG. 7.

This makes it possible to improve the motor power, particularly for motors having low axial heights. Increasing the thickness of the back yoke in an axial direction also makes it possible to reduce the width of the back yoke in a radial direction in order to gain more winding space in the stator slots.

The features revealed in the above description, the claims and the figures can be important for the realization of the invention in its various embodiments both individually and in any combination whatsoever.

Identification Reference List
10 Stator body
12 Back yoke ring
14 Stator poles
16, 16' stator end lamination
18 Connecting points
20 Windings
22 Connecting wire
24, 24' Projections, tongues
28 Bearing
36 Shaft
38 Hub
40 Rotor magnets
42 Housing
44 Rotor arrangement
46, 46' Projections, tongues
48 Pole shoes
50 second to last stator lamination

The invention claimed is:

1. A stator arrangement for an electric machine having a stator body (10) which has a back yoke ring (12) and a number of stator teeth (14) that project in a radial direction from the back yoke ring (12), wherein at least one additional ferromagnetic stator end lamination (16) is mounted on at least one end face of the back yoke ring (12), the additional ferromagnetic stator end lamination (16) being substantially flush with the back yoke ring (12), wherein projections (24) are formed at the inner or outer circumference of the additional stator end lamination (16), the projections (24) projecting axially from the outer end face of the stator end lamination and forming a guide for the winding wire, wherein the additional stator end lamination (16) does not cover or does not fully cover the area of the stator teeth and carries a part of the magnetic flux through the stator when the machine is in operation so that the magnetic saturation of the stator body (10) in the area of the back yoke ring (12) is reduced.

2. A stator arrangement according to claim 1, wherein the stator end lamination (16) has tongues that are bent in the way of hooks in the direction of the outer end face of the stator end lamination (16) and form the projections (24).

3. A stator arrangement according to claim 2, wherein the tongues are bent at an angle of about 70° to 80°, more particularly about 75° towards the surface of the stator end lamination.

4. A stator arrangement according to claim 2, wherein the stator teeth (14) of the stator body (10) are wound with winding wire (20) and that the winding wires between the stator teeth (14) are guided and held in position by the projections (24) of the stator end lamination (16).

5. A stator arrangement according to claim 1, wherein a second to last stator lamination (50) is sandwiched between the stator body (10) and the stator end lamination (16), the second to last stator lamination (50) covering the stator teeth (14) and, at the pole shoes (48) having projections (46') at the distal end of the stator teeth, the projections projecting axially from the associated end face.

6. A stator arrangement according to claim 5, wherein the second to last stator lamination (50) is extended in the area of the pole shoes and is bent to be L-shaped for forming the projections (46').

7. A stator arrangement according to claim 1, wherein the stator end lamination (16') covers the stator teeth (14) and, at the pole shoes (48) at the distal ends of the stator teeth comprises projections (46) which project axially from the associated end face.

8. A stator arrangement according to claim 7, wherein the stator end lamination (16') is extended at the pole shoes (48) and is bent to be L-shaped to form the projections (46).

9. A stator arrangement according to claim 8, wherein the pole shoe extensions are bent at an angle of about 90° towards the surface of the stator end lamination.

\* \* \* \* \*